US 6,625,469 B1

(12) United States Patent
Hwang et al.

(10) Patent No.: US 6,625,469 B1
(45) Date of Patent: Sep. 23, 2003

(54) UPPER SUPPORT ASSEMBLY FOR A WIRELESS COMMUNICATION DEVICE

(75) Inventors: Sung-gul Hwang, Evanston, IL (US); Thomas William Koehl, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 507 days.

(21) Appl. No.: 09/635,311

(22) Filed: Aug. 9, 2000

(51) Int. Cl.⁷ ............................................. H04M 1/00
(52) U.S. Cl. .................. 455/550.1; 575/575.7; 379/433.01; 379/446; D14/138
(58) Field of Search ........................ 455/90, 550.1, 455/575.1, 575.7, 351, FOR 121; 379/433.01, 446; D14/138, 248; 24/598.2, 599.4; 343/702, 906, 841, 720

(56) References Cited

U.S. PATENT DOCUMENTS

| | | | |
|---|---|---|---|
| 267,112 A | * | 11/1882 | Sanderson .................. 24/598.2 |
| 636,244 A | * | 11/1899 | Crosby |
| 3,956,701 A | | 5/1976 | James, Jr. et al. |
| 5,151,946 A | * | 9/1992 | Martensson ............... 455/575.4 |
| 5,257,310 A | * | 10/1993 | Takagi et al. ........... 379/433.13 |
| 5,551,069 A | | 8/1996 | Harrison et al. |
| 5,890,072 A | * | 3/1999 | Rabe ........................ 455/550.1 |
| 5,907,615 A | | 5/1999 | Kaschke |
| D428,610 S | * | 7/2000 | Zoiss et al. ................. D14/147 |
| 6,094,566 A | * | 7/2000 | Dasent et al. ............. 455/575.6 |
| D430,129 S | * | 8/2000 | Sillers ........................ D14/147 |
| 6,223,402 B1 | * | 5/2001 | Lacy .......................... 24/599.4 |
| 6,246,374 B1 | * | 6/2001 | Perrotta et al. ............. 343/702 |
| D444,454 S | * | 7/2001 | Hanna et al. ............... D14/138 |

FOREIGN PATENT DOCUMENTS

| | | |
|---|---|---|
| EP | 0036442 A1 | 9/1981 |
| EP | 0036442 B1 | 9/1981 |
| WO | WO9604620 A1 | 2/1996 |

* cited by examiner

Primary Examiner—Lee Nguyen
Assistant Examiner—Kamran Afshar
(74) Attorney, Agent, or Firm—Shigeharu Furukawa; Hisashi D. Watanabe

(57) ABSTRACT

There is provided a radio telephone having an arcuate support (114, 1008, 1506) positioned at an upper portion (104, 1002, 1502) of the radio telephone's housing (102) for attachment to a loop-shaped object, such as a belt loop, bag strap and the like. The arcuate support (114, 1008, 1506) includes a first section (110, 1004, 1504) that is stationary relative to the housing (102), and a second section (112, 1006, 1506) that pivots away from the first section (110, 1004, 1504) to open the support (114, 1008, 1506) and returns back to the first section (110, 1004, 1504) to close the support (114, 1008, 1506). Depending upon the embodiment of the radio telephone, the arcuate support (114, 1008, 1506) may open by moving the second section (112, 1006, 1506) inward from the first section (110, 1004, 1504), outward from the first section (110, 1004, 1504) or both inward and outward relative to the first section (110, 1004, 1504). In addition, an antenna (904) for the radio telephone may be positioned within the arcuate support (114, 1008, 1506) to provide protection for the antenna (904) and maintain the antenna (904) at a desired position above the radio telephone.

23 Claims, 8 Drawing Sheets

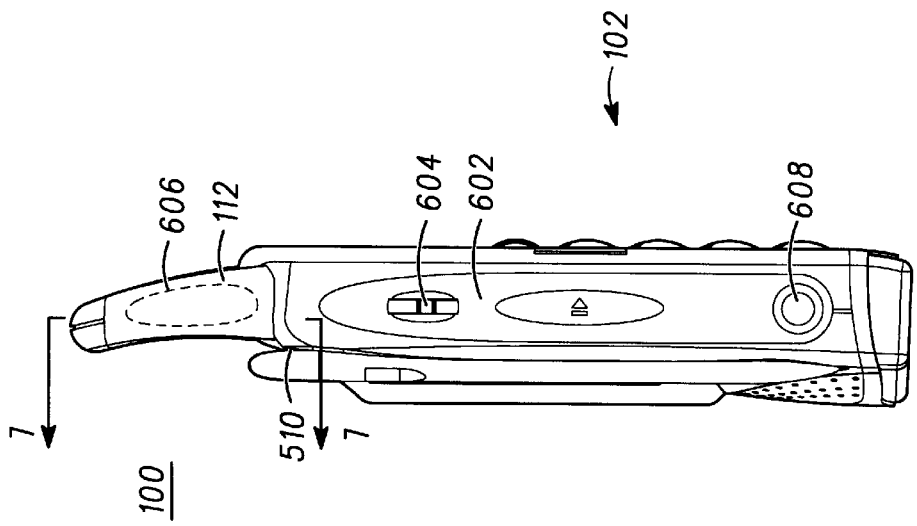
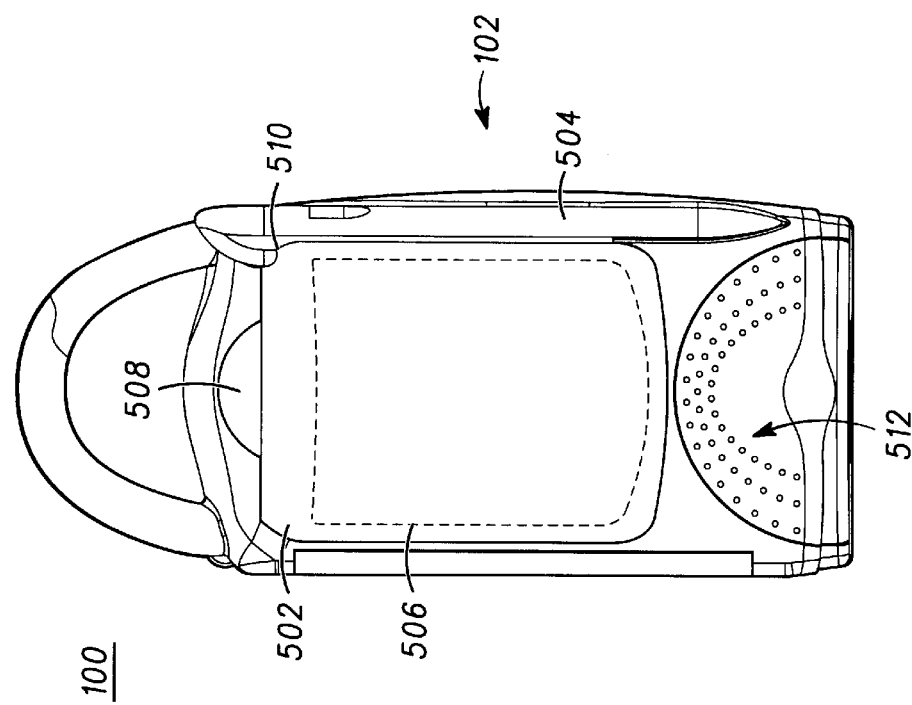

UPPER SUPPORT ASSEMBLY FOR A WIRELESS COMMUNICATION DEVICE

FIELD OF THE INVENTION

The present invention relates generally to the field of support assemblies for wireless communication devices. More specifically, the present invention relates to various types of hooks and handles that are used to secure and carry wireless products, such as radio telephones, pagers, portable computers, personal digital assistants or multi-functional wireless devices.

BACKGROUND OF THE INVENTION

Wireless communication devices, such as radio telephones, pagers, portable handheld computers or personal digital assistants, are designed to be transportable from one location to another. A device that permits a person to carry the device on the person's body or with the person's belongings is particularly useful and convenient for the user. To facilitate transport, such device is generally small enough to carry in a pocket of one's clothing, such as a shirt, pants or coat. Since the use of one's pocket is often undesirable, the device may have a clip that is integrated to its housing or attachable by an accessory, such as a holster, to a waist band of one's pants or a belt positioned around one's waist.

An integrated clip or holster enable a user to attach the wireless communication device to a belt or waistband, but it is not convenient for attaching the device to any other object. In fact, many users frequently attach, detach and change the position of their devices based on situations and activities. A device having an integrated clip typically positions the clip against the largest flat surface of the device. Similarly, a holster typically has a flat surface corresponding to the largest flat surface of the device and a clip positioned against the flat surface. The integrated clip or clip of a holster has a wide dimension that is appropriate for the large flat surface. For mounting to a belt or waistband, the flat surface of the device or the holster is positioned against the outside surface of the belt or waistband, and the clip wraps around and over the top to contact the inside surface. Accordingly, an integrated clip or holster requires a flat surface and an upper straight edge for mounting.

Some integrated clips are not mounted to large flat surfaces and, thus, do not have wide dimensions. These thinner clips mount to a smaller device or smaller portion of the device such as a flexible metal clip that hangs down from the top of a standard pen and abuts the side of the pen. For wireless communication devices, a thinner integrated clip may be mounted to one side of a pen-shaped device or a narrow side of a radio telephone. Because of the thinner width of the clip, the device needs to be mounted in a shirt, pant, or coat pocket so that the base of the device will be supported by pocket. In other words, the thinner clips are better suited to position and secure the device within a pocket rather than carry the full weight of the device. Also, similar to the wider integrated clips and holsters above, the thinner integrated clips require an upper edge for mounting.

Integrated clips that function as antennas for the wireless communication devices are also known in the art. An clip-shaped antenna must be positioned carefully so that it will provide sufficient transmission and reception for the transceiver circuit of the device. Unfortunately, the clip-shaped antenna must be mounted to the side of the device in order to mount to one's belt or waistband. Although the antenna may be flipped upward above the device to improve its transmission and reception capabilities, it still must be flipped downward against the side of the device when mounted to one's belt or waistband where reception will be poor. In addition, a movable antenna is more likely to have mechanical problems or failures than a rigid antenna. Furthermore, similar to the integrated clips and holsters described above, the clip-shaped antennas clips require a upper edge for mounting to a belt, waistband or top edge of a pocket.

Accordingly, there a need for a support assembly that provides a user with the flexibility to attach a wireless communication device to an object other than a belt, waistband or pocket. Also of particular interest is a support assembly for attachment of a wireless communication device to other personal effects such as a handbag, pocket book and the like. In particular, the support assembly should not be restricted to attachment to an object having an upper edge, such as a belt, waistband or pocket. In addition, it is desirable to have a support assembly that also functions as an antenna with adequate or better transmission and reception capabilities. The support assembly should permit a user to attach, detach and change the position of the device on the person's body, belongings or objects near the user.

BRIEF DESCRIPTION OF THE DRAWINGS

FIG. 5 is a back plan view of the first preferred embodiment of FIG. 1;

FIG. 6 is a left side plan view of the first preferred embodiment of FIG. 1;

DETAILED DESCRIPTION OF THE PREFERRED EMBODIMENTS

The present invention is a portable wireless communication device that includes a housing having an electronic circuit for wireless communication with one or more remote communication devices. The structure of the housing includes an upper portion and two sections supported by the upper portion, a stationary section and a movable section. The stationary section has a stationary supported end connected to the upper portion, a stationary distal end positioned at a particular location above the upper portion, and a body between the two stationary ends to maintain the stationary distal end at the particular location above the upper portion. The movable section has a movable supported end connected to the upper portion, a movable distal end positioned a particular distance from the movable supported end, and a movable body between the movable two end to maintain the movable distal end at the particular distance from the movable supported end. Also, the movable distal end of the movable section has a closed position adjacent to the stationary distal end of the stationary section and an opened position away from the stationary distal end of the stationary section.

Figure 2:
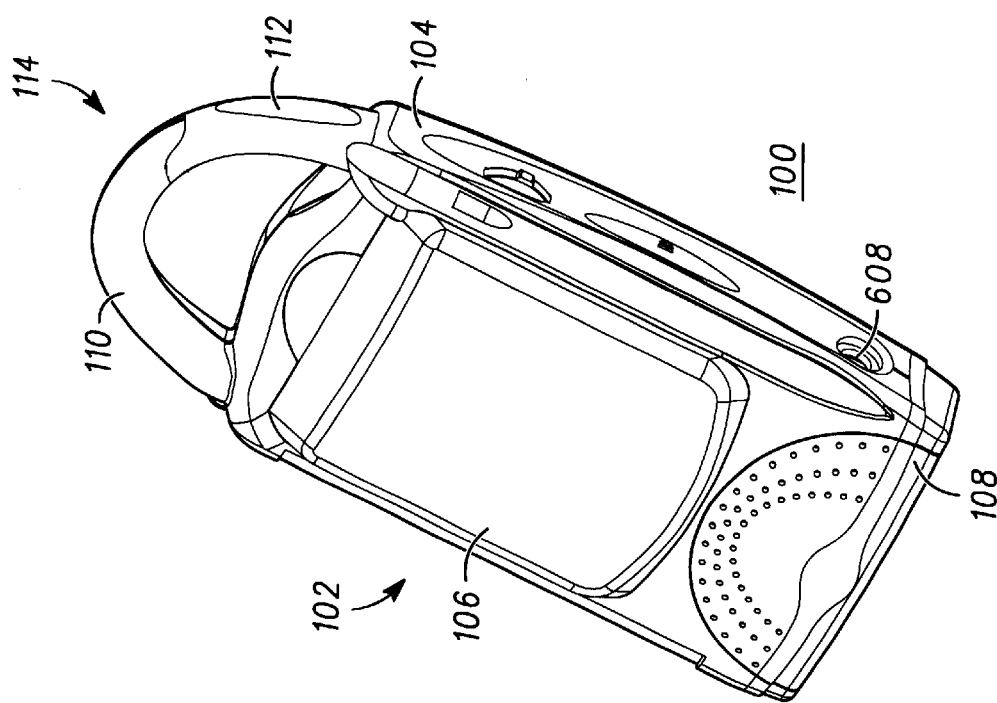
FIG. 2 is a backside perspective view of the first preferred embodiment of FIG. 1 showing the back, bottom and left side of the first preferred embodiment.
Figure 1:
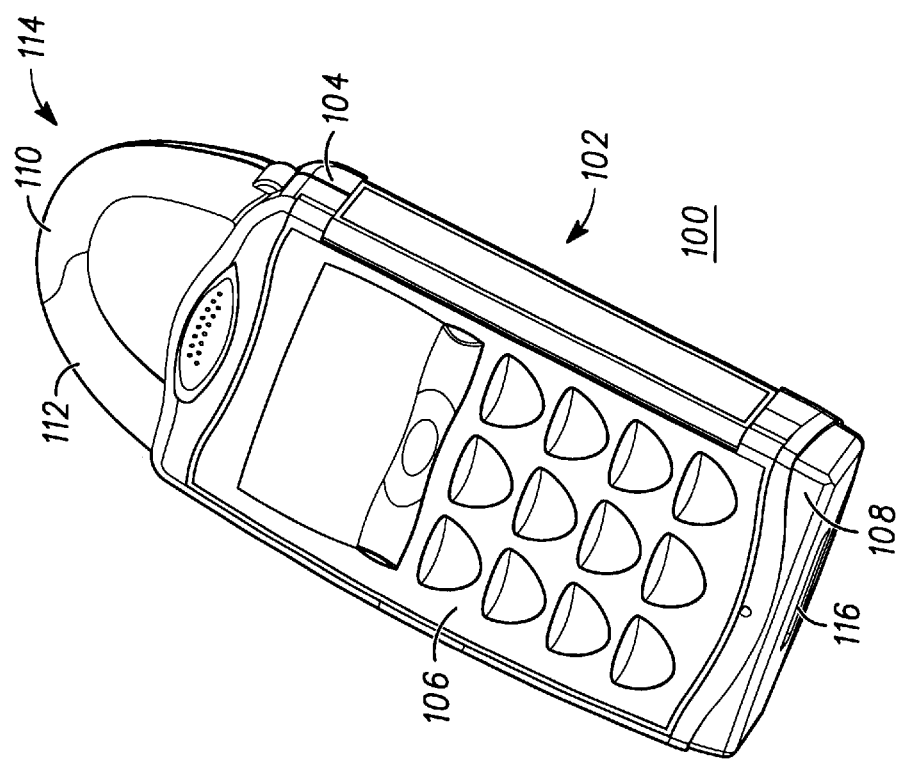
FIG. 1 is a frontal perspective view of a first preferred embodiment of the radio telephone of the present invention showing the front, bottom and right side of the first preferred embodiment.

There is generally shown in FIGS. 1 and 2 a first preferred embodiment 100 of portable wireless communication device of the present invention. The first preferred embodiment is a radio telephone for wireless communication with one or more remote communication devices using a communication system, such as a standard cellular telephone system. Although the preferred embodiments described herein are preferably radio telephones, one skilled in the art will recognize that the features discussed will also find application in other types of communication devices such as cordless telephones, personal digital assistants, two-way radios, pagers, portable computers, multi-functional communication devices and the like.

Referring to FIGS. 1 and 2, the radio telephone 100 includes a housing 102 having an upper portion 104, a middle portion 106 and a lower portion 108. The upper portion 104 supports two curved sections, namely a stationary section 110 and a movable section 112, that form an arch or arcuate section 114 above the upper portion. The lower portion 108 of the housing 102 includes an external connector 116 for interfacing various accessories to the radio telephone, such as a power adapter, car kit, earpiece/microphone attachment, cable attachment to a computer, and the like.

Figure 3:
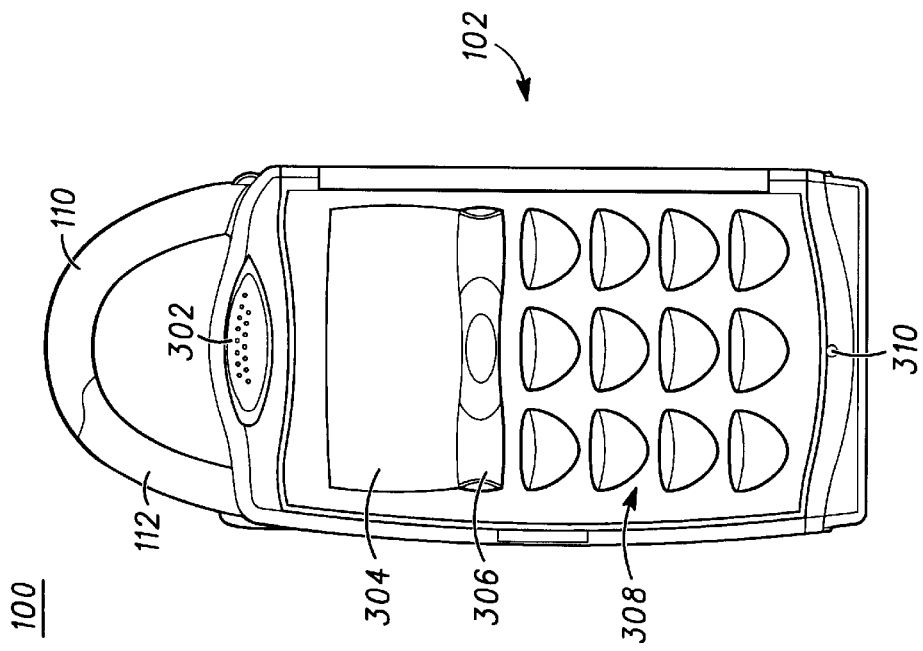
FIG. 3 is a front plan view of the first preferred embodiment of FIG. 1.

Referring to FIG. 3, various input and output components are provided at the front of the preferred embodiment 100. The front of radio telephone includes speaker apertures 302, display lens 304, touch-sensitive buttons 306, keypad 308 and microphone aperture 310. The speaker apertures 302 direct audible sounds produced by an internal speaker (shown in FIG. 9) to the outside of the housing 102. The display lens 304 is a transparent surface that covers a display 314 (shown in part) of the radio telephone. The touch-sensitive buttons 306 and keypad 308 provide electrical input signals, directly or indirectly, to the internal electronic circuitry (not shown) of the radio telephone in response to touch or contact by an external object, such as a user's finger. The microphone aperture 310 directs audible sounds from the outside of housing 102 to an internal microphone (shown in FIG. 9).

Figure 4:
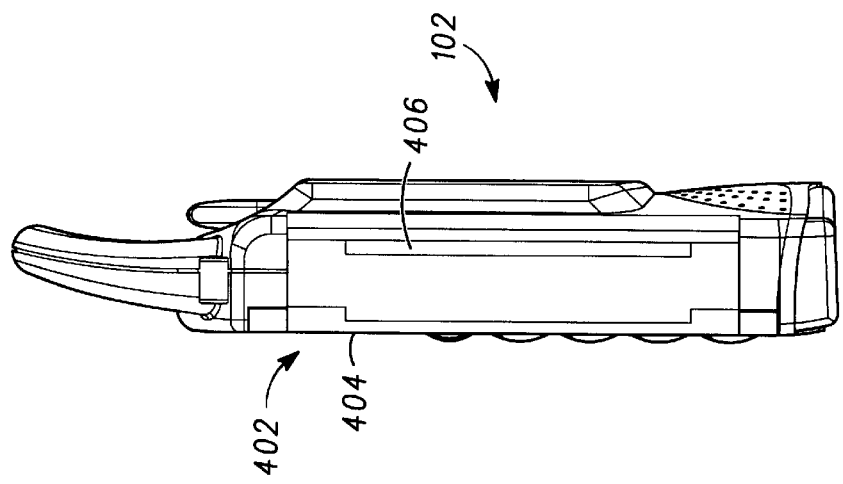
FIG. 4 is a right side plan view of the first preferred embodiment of FIG. 1.

Referring to FIG. 4 along with FIG. 3, the display lens 304, the touch-sensitive buttons 306 and the keypad 308 may be positioned on a double-hinged flap 402 that wraps around the front and right sides of the first preferred embodiment 100. The double-hinged flap 402 includes a first hinge 404 provided at the front right vertical edge of the radio telephone and a second hinge 406 provided at the back right vertical edge of the radio telephone. The double-hinged flap 402 may be pulled-back away from the front of the housing 102 to expose the remainder of the display 314. By exposing the display 314 in this manner, the display may have dimension that extend to the edges of the housing 102. Accordingly, with this large display, the radio telephone may also function as a personal digital assistance or similar computing device.

Referring to FIG. 5, a battery pack cover 502 and a pen 504 are provided at the back of the housing 102. The battery pack cover 502 retains a battery 506 of the radio telephone within the housing 102. A latch 508 is actuated to release the battery pack cover 502 from, and secure it to, the back of the housing 102. The pen 504 is attachable to the back of the housing 102 by sliding it into a retaining groove 510 of the housing. If the radio telephone is used as a personal digital assistant as described above, the pen 504 may be used to interact with the display 314 (shown in FIG. 3). A plurality of speakerphone apertures 512 are provided at the lower back portion of the housing 102. The speakerphone apertures 512 direct audible sounds produced by an internal speaker to the outside of the housing 102 and/or direct audible sounds from the outside of housing to an internal microphone, similar to the speaker and microphone shown in FIG. 9. The speakerphone apertures 512 are positioned at the lower back portion of the housing 102 so that they are positioned away from the speaker apertures 302 (shown in FIG. 3) at the upper front portion of the housing. Accordingly, when the speaker apertures 302 are held adjacent to one's ear, the user will not be startled by loud sounds from the speakerphone apertures 512 if the speakerphone is activated.

Referring to FIG. 6, the left side of the radio telephone of the preferred embodiment 100 may include a gripping surface 602 to facilitate the handling of the radio telephone by a user. For the first preferred embodiment, the gripping surface 602 is a rubberized contour providing a resting place of the user's fingers or thumb. Also, similar to the other side of the radio telephone, the gripping surface 602 may include input controls for operating the radio telephone, such as a rotating dial 604. In addition, the movable section 112 of the radio telephone may have a receiving surface 606 for facilitating contact of an object with the movable section. For example, the receiving surface 606 may be contoured and/or coated for providing a steady grip when in contact with a human finger, or the receiving surface may be reinforced to counter any object that may be pressed against the movable section 112. In addition, the gripping surface 602 may include additional input/output ports such as receiving jack 608 (also shown in FIG. 2) for receiving a headset, earpiece, and the like.

Figure 7:
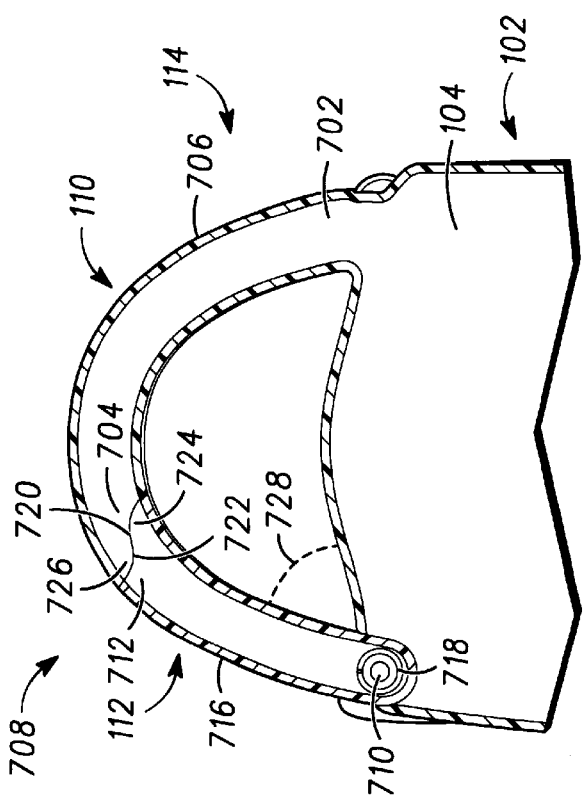
FIG. 7 is a cross-sectional, close-up view of the first preferred embodiment of FIG. 1 taken along line 7–7' of FIG. 6 in which the movable section is in an opened position.

Referring to FIG. 7, the stationary section 110 of arcuate section 114 is supported by the upper portion 104 of housing 102. For the first preferred embodiment 100, the stationary section 110 is an elongated curved structure having two ends: a stationary supported end 702 is connected to the upper portion 104 and a stationary distal end 704 is positioned at a particular location above the upper portion. In addition, the stationary section 110 includes an elongated, stationary body 706 between the two ends 702, 704 that is made of a substantially rigid material and is immovably fixed to the upper portion 104 so that the stationary distal end 704 is maintained at the particular location above the upper portion 104. This rigid arcuate structure of the stationary section 110 prevents the stationary distal end 704 from contacting the upper portion 104.

Preferably, the stationary section 110 has a structural strength and design that is capable of supporting the entire weight radio telephone of the first preferred embodiment 100. In particular, the stationary section 110 has a smooth and continuous curved shape that is substantially ovular and extends from the stationary supported end 702 to the stationary distal end 704. For the first preferred embodiment shown in FIG. 7, the stationary section 110 extends upward from the right side of upper portion 104 and curves around to be substantially horizontal above the middle of the upper portion 104. For this embodiment, the arcuate structure of the stationary section 110 extends slightly beyond the middle of the upper portion 104 begins to curve back downward toward the upper portion.

Figure 8:
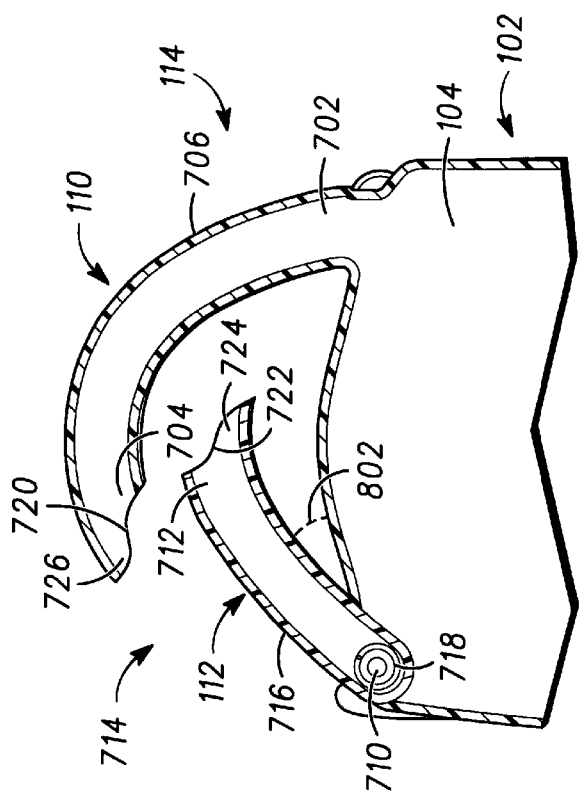
FIG. 8 is another cross-sectional, close-up view of the first preferred embodiment of FIG. 1, similar to the cross-sectional, close-up view of FIG. 7, in which the movable section is in a closed position.

Referring to FIGS. 7 and 8 together, the movable section 112 of arcuate section 114 is also supported by the upper portion 104 of housing 102. The movable section 112 is capable of moving between various positions relative to the stationary section 110 and, in one particular position, the movable section and the stationary section form a completed arch-shaped above upper portion 104. In a closed position 708 of the first preferred embodiment shown in FIG. 7, the movable section 112 has an elongated curved shape in which a movable supported end 710 connected to the upper portion 104 and a movable distal end 712 positioned at a particular location above the upper portion. The movable distal end 712 of the movable section 112 is adjacent to the stationary distal end 704 of the stationary section 110. On the other hand, in an opened position 714 shown in FIG. 8., the movable distal end 712 of the movable section 112 is positioned away from the stationary distal end 704 of the stationary section 110.

The movable section 112 is made of a substantially rigid material so that the movable distal end 712 is positioned a particular distance from the movable supported end 710. The movable section 22 includes a movable body 716 between the movable supported end 710 and the movable distal end 712 that is substantially rigid. The rigid structure of the movable body 716 maintains the movable distal end 712 at the particular distance from the movable supported end 710.

To permit the movable section 112 to move between the closed and opened positions 708, 714 respectively described above, the movable supported end 710 of the movable section 112 is pivotally connected to the upper portion 104 of the housing 102. A spring-loaded mechanism 718 connected to the movable supported end 710 of the movable section 112 that is effective to bias the movable distal end 712 of the movable section to the closed position 708. Specifically, one end of the spring-loaded mechanism 718 contacts an outer part of the movable supported end 710, and the other end of the mechanism contacts an inside part of the upper portion 104 within the vicinity of the movable supported end 710. As the movable section 112 moves from the closed position 708 to the opened position 714, the spring-loaded mechanism 718 will stretch beyond its default shape and, thus, the tension on the mechanism will bias the movable section back toward to the closed position.

In order to keep the spring-loaded mechanism 718 from pulling the movable section 112 in the other direction beyond the closed position 708, the stationary distal end 704 of the stationary section 110 and the movable distal end 712 of the movable section 112 have abutting mating surfaces 720, 722 that contact each other at the closed position 708. The abutting mating surfaces 720, 722 permit the movable distal end 712 to move in one direction away from the stationary distal end 704 and prevent the movable distal end from moving in an opposite direction against the stationary distal end. The abutting mating surfaces 720, 722 are able to provide the above functionality by forming a lower extension 724 of the movable distal end 712 and an upper extension 726 of stationary distal end 704 as shown in FIGS. 7 & 8. In particular, the lower extension 724 is the part of movable distal end 712 that is adjacent to a lower part of the abutting mating surface 722 and situated closer to the upper portion 104. Correspondingly, the upper extension 726 of stationary distal end 704 is adjacent to an upper part of abutting mating surface 720 and situated further from the upper portion 104 than the lower extension 724. Due to this structural positioning of the lower and upper extensions 724 and 726, the lower extension cannot move passed the upper extension and so the movable distal end 712 may only move in one direction, i.e. toward the upper portion 104. For the first preferred embodiment 100 shown in FIGS. 7 & 8, the abutting mating surfaces 720, 722 are contoured in a double-curved shape to further enhance the uni-directional characteristic of the lower and upper extensions 724, 726. However, it is to be understood that the abutting mating surfaces 720, 722 of the present invention may have other forms that situate the lower extension 724 in front of the upper extension 726, such as a straight angled profile. Also, FIG. 7 shows the movable section 112 positioned at a first angle 728 relative to the upper portion 104 for the closed position 708, and FIG. 8 shows the movable section positioned at a second angle 802 relative to the upper portion for the opened position 714 in which the first angle for the closed position is greater than the second angle for the opened position. Accordingly, the movable section 112 opens inward such that the movable distal end 712 is located closer to the upper portion 104 of the housing 102 in the opened position 714 than the closed position 708.

Figure 9:
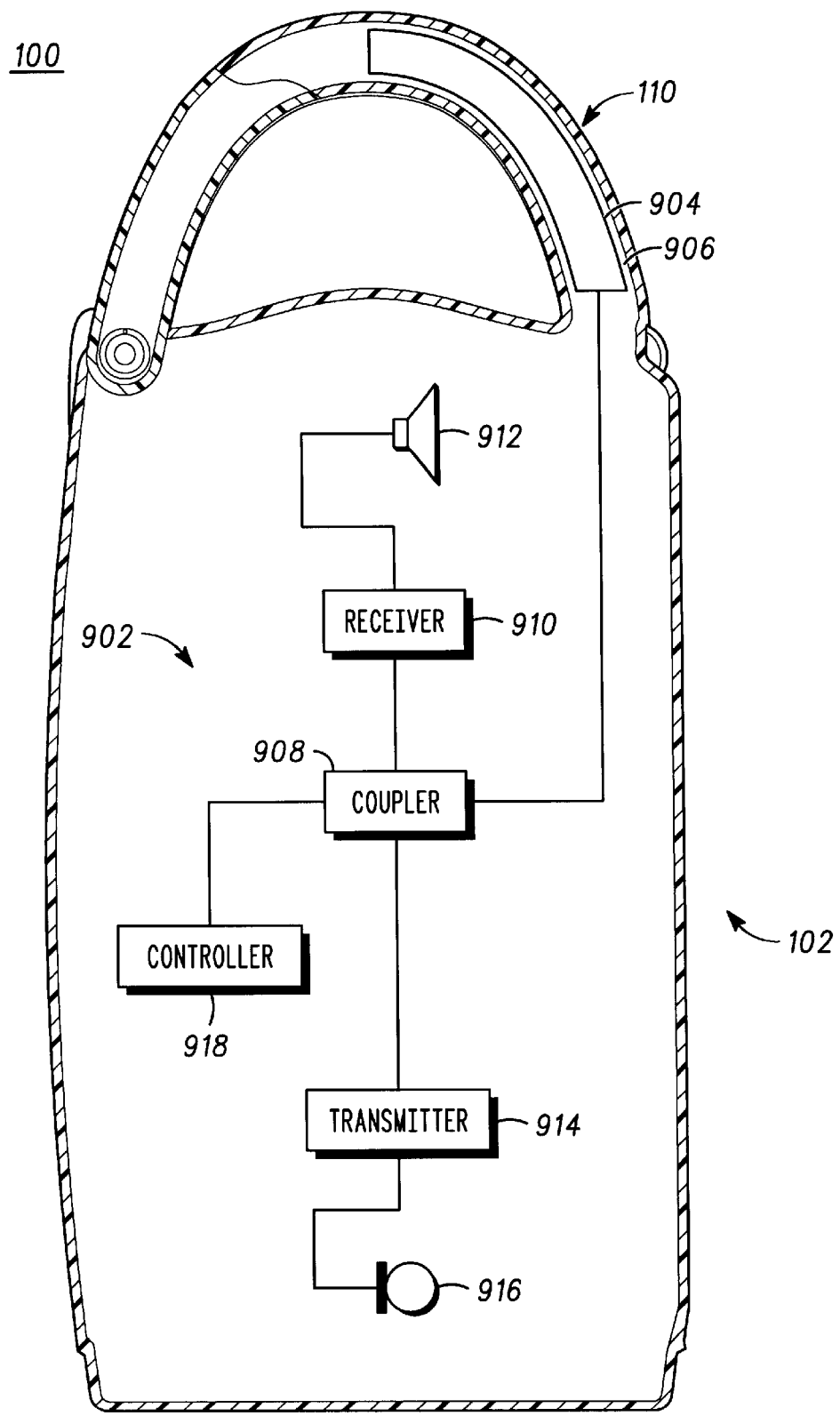
FIG. 9 is a block diagram of specific components of the first preferred embodiment of FIG. 1.

Referring to FIG. 9, the housing 102 of the first preferred embodiment 100 encloses a transceiver or electronic circuit 902 and includes an antenna 904 for wireless communication with one or more remote communication devices. Various types of antennas for a wireless communication device may be used for the present invention. An antenna may be situated external or internal to the housing of the device. Such antenna includes, but is not limited to, a whip antenna, extendable antenna, stub-nose antenna and conductive traces located on the inner wall of the housing. Although such antennas may be used with the present invention, the preferred embodiments described herein situate at least a portion of the antenna 904 within the stationary section 110. Stationary section 110 is made of a substantially rigid, minimally-interfering material that provides protection and support for the antenna 904 without significant interference with the antenna's transmitting and receiving capabilities. Also, stationary section 110 permits the antenna 904 to be positioned above the housing 102 where it is not against the user's body and communication can be optimized. The first preferred embodiment shown in FIG. 9, shows a curved antenna 904 that is completely positioned within, and extends through most of, an inner compartment 906 of the stationary section. However, it is to be understood that the stationary section 110 and antenna 904 combination of the present invention is designed to work with a wide variety of antenna shapes and sizes.

The electronic circuit 902 includes a coupler 908, receiver 910, speaker 912, transmitter 914, microphone 916 and controller 918. The coupler 908 interconnects electrically the antenna 904 to the receiver 910, transmitter 914 and controller 918. Incoming transmission signals received by the antenna 904 are routed by the coupler 908 to the receiver 910 for conversion to an incoming audio signal. The speaker 912 converts the incoming audio signal to audible sounds to be heard by the user through speaker apertures 302 (shown in FIG. 3). The microphone 916 receives perceived sounds through microphone aperture 310 (shown in FIG. 3) and converts them to outgoing audio signals. The transmitter 914 converts the outgoing audio signals to outgoing transmission signals, and the coupler routes the outgoing transmission signals to the antenna for transmission to other communication devices. The controller 918 provides various functions for the incoming and outgoing transmission signals, such as processing incoming data transmissions, generating outgoing data transmissions, filtering and processing transmission signals.

The controller 918 performs other functions of the radio telephone which include, but are not limited to, controlling input components, output components, external interfacing and power source components. The input components include, for example, the touch-sensitive buttons 306, keypad 308 and rotating dial 604 shown in FIGS. 3 and 6. The output components include, for example, the display 604 shown in FIG. 3. The external interfacing components include, for example, the external connector 116 and receiving jack 608 shown in FIGS. 1, 2 and 6. The power source components include, for example, the battery 506 shown in FIG. 5. The controller 918 also performs general radio telephone functions and may perform non-general functions such as the personal digital assistant functions described above.

Figure 10:
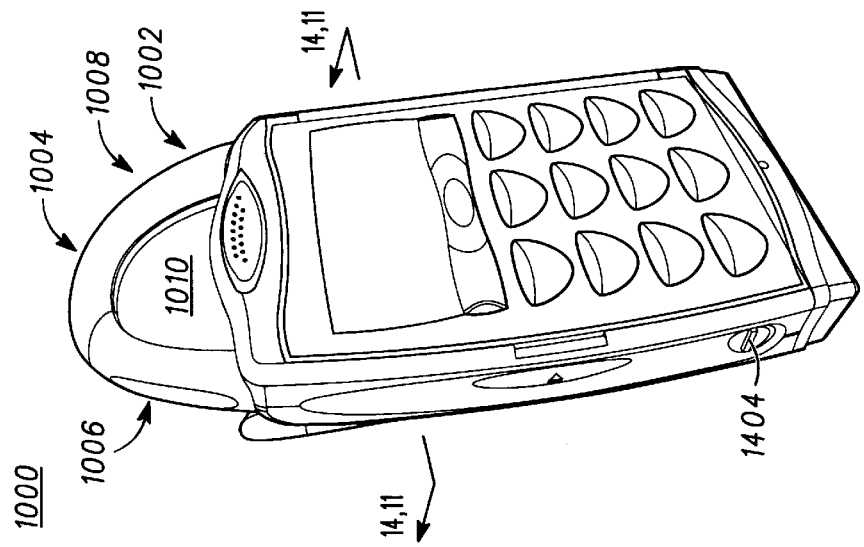
FIG. 10 is a frontal perspective view of a second preferred embodiment of the radio telephone of the present invention showing the front, top and left side of the second preferred embodiment.

Referring to FIG. 10, there is shown a second preferred embodiment 1000 of the radio telephone of the present invention. The second preferred embodiment 1000 includes an upper portion 1002 having a stationary section 1004 and a movable section 1006. The stationary section 1004 and the movable section 1006 form an arch or arcuate section 1008 above the upper portion 1002. In contrast to the first preferred embodiment 100 described above, the movable section 1006 of the second preferred embodiment 1000 is capable of moving away from, as well as inward toward, an inside area 1010 of the arcuate section 1008.

Figure 11:
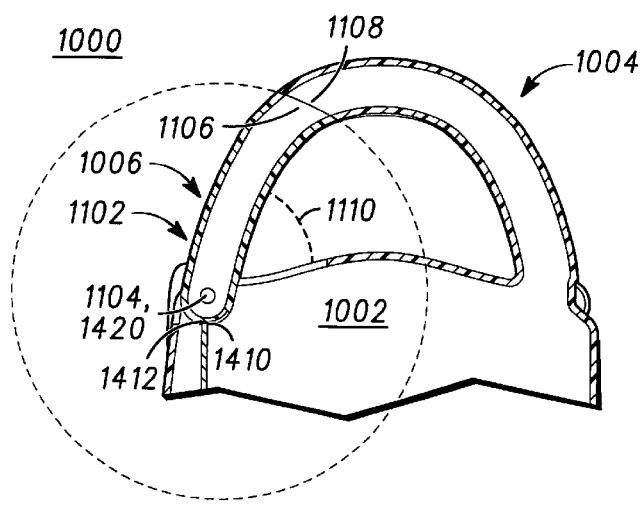
FIG. 11 is a close-up, cross-sectional view of the second preferred embodiment taken along line 11–11' of FIG. 10 in which the movable section is in a closed position.
Figure 12:
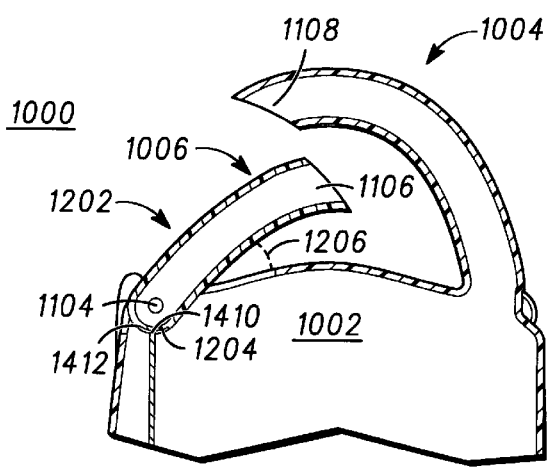
FIG. 12 is another close-up, cross-sectional view of the second preferred embodiment taken along line 11–11' of FIG. 10 in which the movable section is in an inner opened position.
Figure 13:
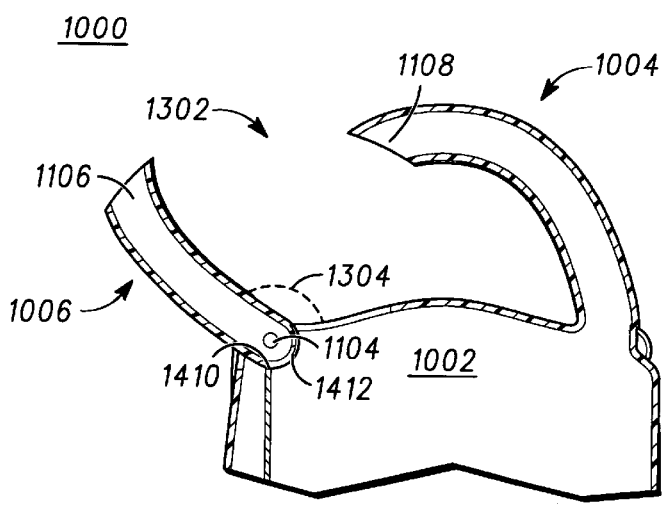
FIG. 13 is still another close-up, cross-sectional view of the second preferred embodiment taken along line 11–11' of FIG. 10 in which the movable section is in an outer opened position.

Referring to FIGS. 11, 12 and 13, the movable section 1006 of the second preferred embodiment 1000 is capable of moving between three or more positions relative to the stationary section 1004. For example, the movable section 1006 may have a closed position 1102 as shown in FIG. 11, an inner opened position 1202 as shown in FIG. 12, and an outer opened position 1302 as shown in FIG. 13. In the closed position 1102 of FIG. 11, the movable section 1006 has a movable supported end 1104 connected for rotation to the upper portion 1002 and a movable distal end 1106 positioned at a particular location above the upper portion. The movable distal end 1106 of the movable section 1006 is adjacent to a stationary distal end 1108 of the stationary section 1004. On the other hand, in the inner opened position 1202 of FIG. 12, the movable distal end 1106 is positioned away from the stationary distal end 1108 and is located closer to the upper portion 1002 than the outer opened position 1302, shown in FIG. 13. Also, in the outer opened position 1302, the movable distal end 1106 is positioned away from the stationary distal end 1108 and is located further from the upper portion 1002 than the closed position 1102.

The positioning of the movable distal end 1106 relative to the upper portion 1002 in the closed position 1102, the inner opened position 1202 and the outer opened position 1302 are shown in FIGS. 11, 12 and 13. FIG. 11 shows the movable section 1006 positioned at a first angle 1110 relative to the upper portion 1002 for the closed position 1102, FIG. 12 shows the movable section positioned at a second angle 1206 relative to the upper portion for the inner opened position 1202, and FIG. 13 shows the movable section positioned at a third angle 1304 relative to the upper portion for the outer opened position 1302. As shown in FIGS. 11, 12 and 13, the first angle 1110 is greater than the second angle 1206 and, also, the third angle 1304 is greater than the first angle.

Figure 14:
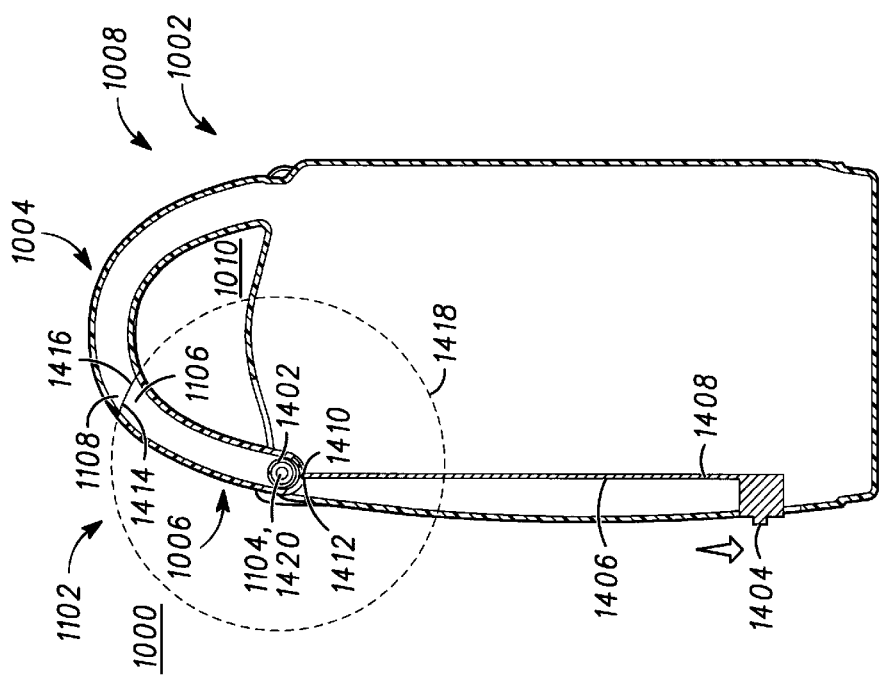
FIG. 14 is a cross-sectional view of the second preferred embodiment taken along line 14–14' of FIG. 10.

Referring to FIG. 14, the movable supported end 1104 is pivotally connected to the upper portion 1002 to permit the movable section 1006 to move between the closed position 1102 and the two opened positions 1202, 1302 described above. A spring-loaded mechanism 1402 may be connected to the movable supported end 1104 to bias the movable distal end 1106 to the outer opened position 1302. In order to prevent the spring-loaded mechanism 1402 from pulling the movable section 1006 toward the outer opened position 1302 beyond the closed position 1102, a release button 1404 is mechanically coupled to the movable supported end 1104 via an internal rail 1406. One end 1408 of the internal rail 1406 is connected to the release button 1404 and the other end 1410 of the internal rail abuts an peripheral step 1412 of the movable support end 1104. (The other end 1410 of the internal rail 1406 and the peripheral step 1412 are shown magnified in FIGS. 11 through 13.) The release button 1404 and the internal rail 1406, moving in conjunction with each other, have an abutting position that permits the movable section 1006 to move inward toward the inside area 1010 of the arcuate section 1008 but prevents the movable section from moving outward away from the inside area of the arcuate section. The abutting position of the release button 1404, the internal rail 1406 and the internal rail end 1408 is shown in FIGS. 11, 12 and 14. In the abutting position, the movable section 1006 is still permitted to move inward toward the inside area 1010 due to a end groove 1204 formed around a partial periphery of movable supported end 1004 and adjacent to the peripheral step 1412 as shown, by example, in FIG. 12.

The release button 1404 and the internal rail 1406 also have a releasing position that permits the movable section 1006 to move outward away from the inside area 1010 of the arcuate section 1008 as well as inward toward the inside area. The releasing position of the release button 1404, the internal rail 1406 and the internal rail end 1408 is shown in FIG. 13. When the release button 1404 is actuated, the movable distal end of the movable section is able to move from the first angle 1110 shown in FIG. 11 to the third angle 1304 shown in FIG. 13. Accordingly, the release button 1404 of the second preferred embodiment 1000 permits the movable distal end 1106 to move further from the upper portion 1002 than the stationary distal end 1108.

Comparing FIG. 14 to FIG. 7, the second preferred embodiment 1000 includes sliding mating surfaces 1414, 1416 having a shape that permits the movable section 1106 to move beyond the closed position 1102 to the outer opened positions 1302 in contrast to the abutting mating surfaces 720, 722 of the first preferred embodiment 100. The abutting mating surfaces 720, 722 of the first preferred embodiment 100 prevent the movable distal end 712 from moving against the stationary distal end 704. On the other hand, the sliding mating surfaces 1414, 1416 of the second preferred embodiment 1000 are not obstruct each other and, thus, permit the movable distal end 1106 and the stationary distal end 1108 to slide passed each other. The second preferred embodiment 1000 does not require the abutting mating surfaces 720, 722 (shown in FIGS. 7 & 8) because it uses the release button 1404, the internal rail 1406 and the peripheral step 1412 to prevent the movable section 1006 from moving outward away from the inside area 1010 of the arcuate section 1008, when desired.

As described above, the sliding mating surfaces 1414, 1416 permit the movable distal end 1106 and the stationary distal end 1108 to slide passed each other. To accomplish this bidirectional capability, the sliding mating surfaces 1414, 1416 are formed in alignment with a guiding circle 1418 shown in FIGS. 11 and 14. The guiding circle 1418 is shown in FIGS. 11 and 14; however, the guiding circle not a physical part of the second preferred embodiment 1000, and it is not visible on the actual embodiment. A center point 1420 of the guiding circle 1418 is at the same location as the movable supported end 1104 and, thus, all points along the periphery of the guiding circle are equidistant from the movable supported end. The sliding mating surfaces 1414, 1416 are formed to following the periphery of the guiding circle 1418 as the movable section 1006 rotates about the center point 1420, restricted by the remaining structure of the second preferred embodiment 1000.

Figure 16:
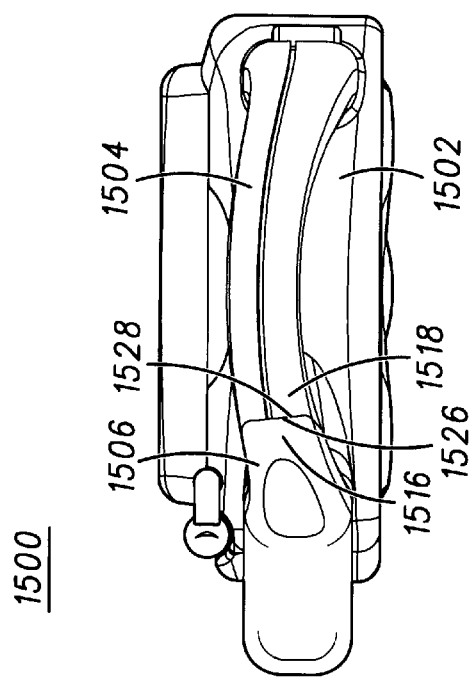
FIG. 16 is a top plan view of the third preferred embodiment of FIG. 15.
Figure 15:
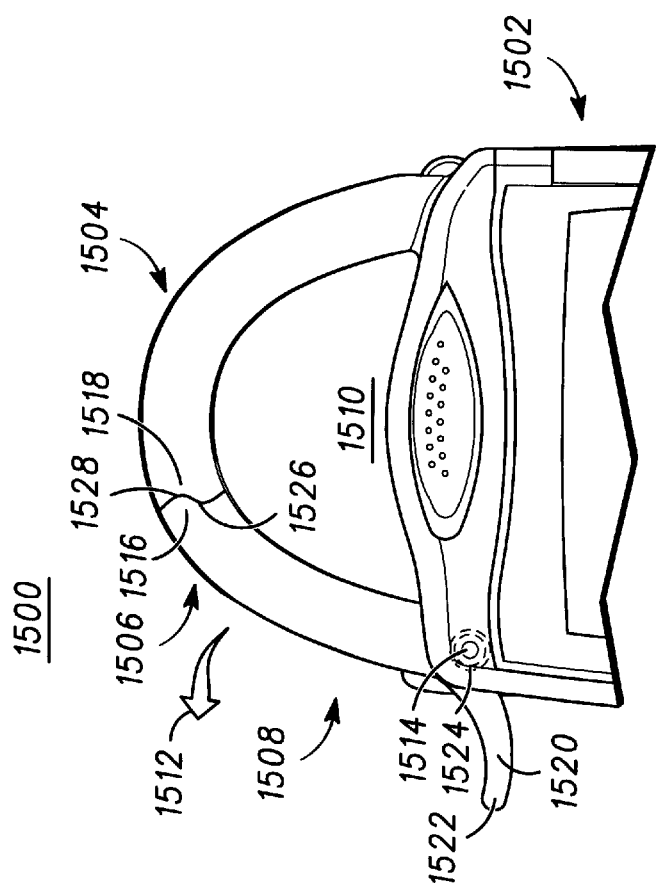
FIG. 15 is a partial, frontal perspective view of a third preferred embodiment of the radio telephone of the present invention showing the front and left side of the third preferred embodiment.

Referring to FIGS. 15 and 16, there is shown a third preferred embodiment is 1500 of the radio telephone of the present invention. The third preferred embodiment 1500 includes an upper portion 1502 being effective to support a stationary section 1504 and a movable section 1506. The stationary section 1504 and the movable section 1506 form an arch or arcuate section 1508 above the upper portion 1502. In contrast to the first and second preferred embodiments described above, the movable section 1506 of the third preferred embodiment 1500 does not move inward toward an inside area 1510 of the arcuate section 1508. The movable section 1506 is capable of moving between two or more positions relative to the stationary section 1504. FIGS. 15 and 16 show the movable section 1506 in its closed position, and arrow 1512 represents the direction that the movable section may shift or rotate in order to open. In its closed position, the movable section 1506 has a movable supported end 1514 connected for rotation to the upper portion 1502 and a movable distal end 1516 positioned at a particular location above the upper portion. The movable distal end 1516 of the movable section 1506 is adjacent to a stationary distal end 1518 of the stationary section 1504. In its opened position, the movable distal end 1516 is positioned away from the stationary distal end 1518 and is located further from the upper portion 1502 than its closed position.

The third preferred embodiment 1500 includes a control lever 1520 for moving the movable distal end 1516 of the movable section 1506 from its closed position to its opened position when the control lever is activated. For the third preferred embodiment shown in FIGS. 15 & 16, the control lever 1520 has a curved shape that is activated by pressing down and inward at an outer end 1522 of the control lever. In response, the movable section 1506 moves to its opened position by rotating about the movable support end 1514 and moving the movable distal end 1516 away from the stationary distal end 1518. A spring-loaded mechanism 1524 connected to the movable supported end 1514 effectively biases the movable distal end 1516 to move back to its position adjacent to the stationary distal end 1518. Thus, by releasing the control lever 1520, the movable section 1506 returns to its closed position shown in FIGS. 15 and 16.

The third preferred embodiment 1500 also includes mating surfaces 1526, 1528 for engaging the movable distal end 1516 to the stationary distal end 1518. The mating surfaces 1526, 1528 of the third preferred embodiment 1500 have S-shaped curvatures that are similar to the mating surfaces 720, 722 of the first preferred embodiment 100 (shown in FIG. 7). However, the mating surfaces 1526, 1528 of the third preferred embodiment 1500 are curved in a direction opposite the mating surfaces 720, 722 of the first preferred embodiment 100 so that the movable section 1506 may not move inward toward the inside area 1510 of the arcuate section 1508 but may move outward away from the inside area.

The radio telephones of the first, second and third preferred embodiments described above have a stationary section and a movable section that permit a user to attach the radio telephone to various objects, particularly those objects that have loops or rings such as belt loops, bag straps, bike saddles and the like. In addition, the antenna of the radio telephone may be hidden in the stationary section for protection and/or support. While the preferred embodiments of the invention have been illustrated and described, it is to be understood that the invention is not so limited. For example, the third preferred embodiment shown in FIG. 15 may be turned-around so that the stationary section 1504 is positioned at the left side of the upper portion 1502 and the movable section 1506 and control lever 1520 is positioned at the right side of the upper portion. Numerous modifications, changes, variations, substitutions and equivalents will occur to those skilled in the art without departing from the spirit and scope of the present invention as defined by the appended claims.

What is claimed is:

1. A portable wireless communication device comprising:
   a housing having an electronic circuit for wireless communication, said housing having an upper portion; and
   first and second sections supported by said upper portion of said housing, said first and second sections having a closed position in which said first and second sections are adjacent to each other and an opened position in which said first and second sections are positioned away from each other, said first section coupled to said electronic circuit.

2. The portable wireless communication device of claim 1, wherein said first section includes a first supported end connected to said upper portion, a first distal end positioned at a particular location above said upper portion, and a first body between said first supported end and said first distal end being effective to maintain said first distal end at said particular location above said upper portion.

3. The portable wireless communication device of claim 2, wherein said second section includes a second supported end connected to said upper portion, a second distal end positioned a particular distance from said second supported end, and a second body between said second supported end and said second distal end being effective to maintain said second distal end at said particular distance from said second supported end.

4. The portable wireless communication device of claim 3, wherein said second distal end is adjacent to said first distal end for said closed position, and said second distal end is positioned away from said first distal end for said opened position.

5. The portable wireless communication device of claim 1, wherein said first section is made of a substantially rigid material and immovably fixed to said upper portion of said housing.

6. The portable wireless communication device of claim 1, wherein said second section is pivotally connected to said upper portion of said housing.

7. The portable wireless communication device of claim 6, further comprising a spring-loaded mechanism connected to said second section, said spring-loaded mechanism being effective to bias said second section to said closed position.

8. The portable wireless communication device of claim 1, wherein said second section is positioned at a first angle relative to said upper portion for said closed position and a second angle relative to said upper portion for said opened position, said first angle being greater than said second angle.

9. The portable wireless communication device of claim 1, wherein said second section is positioned at a first angle relative to said upper portion for said closed position and a second angle relative to said upper portion for said opened position, said second angle being greater than said first angle.

10. The portable wireless communication device of claim 9, further comprising a release button mechanically coupled to said second section, said second section being able to move from said first angle to said second angle when said release button is activated.

11. The portable wireless communication device of claim 1, further comprising a control lever for moving of said second section from said closed position to said opened position when said control lever is activated.

12. The portable wireless communication device of claim 1, wherein said second section includes an abutting surface that contacts said first section at said closed position, said abutting surface being effective to permit said second section to move in one direction away from said first section and prevent said second section from moving in an opposite direction against said first section.

13. The portable wireless communication device of claim 1, wherein said second section includes a sliding surface that is adjacent to said first section at said closed position, said sliding surface being effective to permit said second section to move in first and second directions away from said first section, said first direction being opposite said second direction.

14. A portable wireless communication device comprising:
    a housing having a transceiver circuit for wireless communication, said housing having an upper portion; and
    a section supported by said upper portion of said housing, said section having a supported end connected to said upper portion, said section coupled to said transceiver circuit, a distal end positioned at a particular location above said upper portion, and a body between said supported end and said distal end being effective to maintain said distal end at said particular location above said upper portion and prevent said distal end from contacting said upper portion.

15. The portable wireless communication device of claim 14, wherein said section is made of a substantially rigid material and immovably fixed to said upper portion of said housing.

16. The portable wireless communication device of claim 14, wherein said section is an arcuate section having a curved shape that extends from said supported end to said distal end.

17. The portable wireless communication device of claim 14, further comprising a corresponding section supported by said upper portion of said housing, said corresponding section having a corresponding distal end having a closed position adjacent to said distal end of said section and an opened position away from said distal end of said section.

18. A portable wireless communication device comprising:
    a housing having an electronic circuit for wireless communication, said housing having an upper portion; and
    a section supported by said upper portion of said housing, said section having a supported end connected to said upper portion, a distal end positioned at a particular location above said upper portion, and a body between said supported end and said distal end being effective to maintain said first distal end at said particular location above said upper portion,
    wherein at least a portion of said section is coupled to said electronic circuit.

19. The portable wireless communication device of claim 18, wherein said section includes an antenna coupled to said electronic circuit, at least a portion of said antenna being supported by a remainder of said section.

20. The portable wireless communication device of claim 19, wherein said body of said section includes an inner compartment for receiving said at least a portion said antenna, said section being effective to protect said antenna from foreign matter external to said housing and said upper section.

21. The portable wireless communication device of claim 18, wherein said section is an antenna coupled to said electronic circuit.

22. The portable wireless communication device of claim 18, wherein said section is an arcuate section having a curved shape that extends from said supported end to said distal end.

23. The portable wireless communication device of claim 18, further comprising a corresponding section supported by said upper portion of said housing, said corresponding section having a corresponding distal end having a closed position adjacent to said distal end of said upper section and an opened position away from said distal end of said upper section.

* * * * *